Sept. 17, 1963     W. K. LEWIS     3,104,155
SEPARATION OF HEAT CARRIER FROM FLUIDIZED BED
Filed Nov. 3, 1958     2 Sheets-Sheet 1

Warren K. Lewis     Inventor

By *Henry Berk* Attorney

Sept. 17, 1963 W. K. LEWIS 3,104,155
SEPARATION OF HEAT CARRIER FROM FLUIDIZED BED
Filed Nov. 3, 1958 2 Sheets-Sheet 2

Warren K. Lewis Inventor
By Henry Berk Attorney

United States Patent Office 3,104,155
Patented Sept. 17, 1963

3,104,155
SEPARATION OF HEAT CARRIER FROM FLUIDIZED BED
Warren K. Lewis, Newton, Mass., assignor to Esso Research and Engineering Company, a corporation of Delaware
Filed Nov. 3, 1958, Ser. No. 771,486
12 Claims. (Cl. 23—1)

This invention relates to a method and apparatus for passing well dispersed coarse solid particles downwardly through a bed of fines or powder fluidized in a rising gas stream and for achieving a good separation of the coarse particles from the fines.

For convenience, the fluidized powder will be called "fines" and the coarse solid particles passed downwardly through the fluidized bed of fines will be called "carrier." The carrier particles are in general coarser (larger diameter) or denser, or both, than the fines. The carrier may be an inert material used for temperature control, i.e., a heat carrier.

Briefly, with the method of this invention carrier flows down through a bed of fluidized fines established in an upper part of a unit and forms a lower moving bed of carrier that is suitably free of fines at the bottom of the unit with proper gas flow up through the moving bed and into the fluidized fines above the moving bed.

There are many processes in which one wishes to supply heat to, or remove heat from the fines by flowing continuously down through a fluidized bed of fines a carrier heated or cooled appropriately before entering the bed and obtain separation of the carrier from the fines. The separated carrier may be restored to its initial temperature in another zone for recycling. One use of such an operation is in heterogeneous reactions of fines with a gaseous reactant, e.g., reduction of a metal oxide. Another use is in reacting gaseous substances with catalytic fines. Even the coarse particles may be treated or undergo reaction to some extent in some instances in the fluidized bed of fines, or when separated from the fines. Also the operation is useful for very sharp segregation or classification of particles according to size and/or density.

A brief description of method embodying the invention will be made with reference to the drawings attached to and forming part of this specification.

Figure 1:
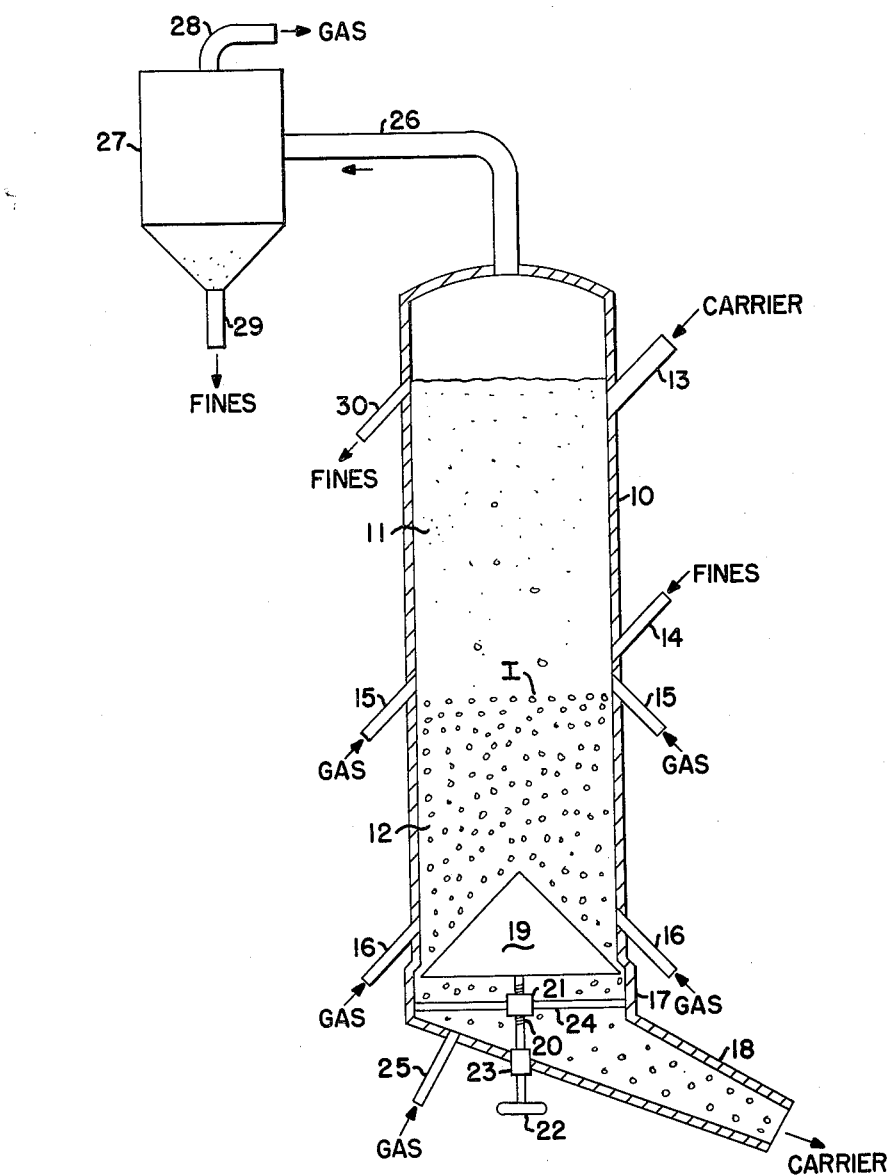

In FIG. 1 of the drawings is diagrammatically portrayed a single vessel system for carrying out the method of this invention.

Figure 2:
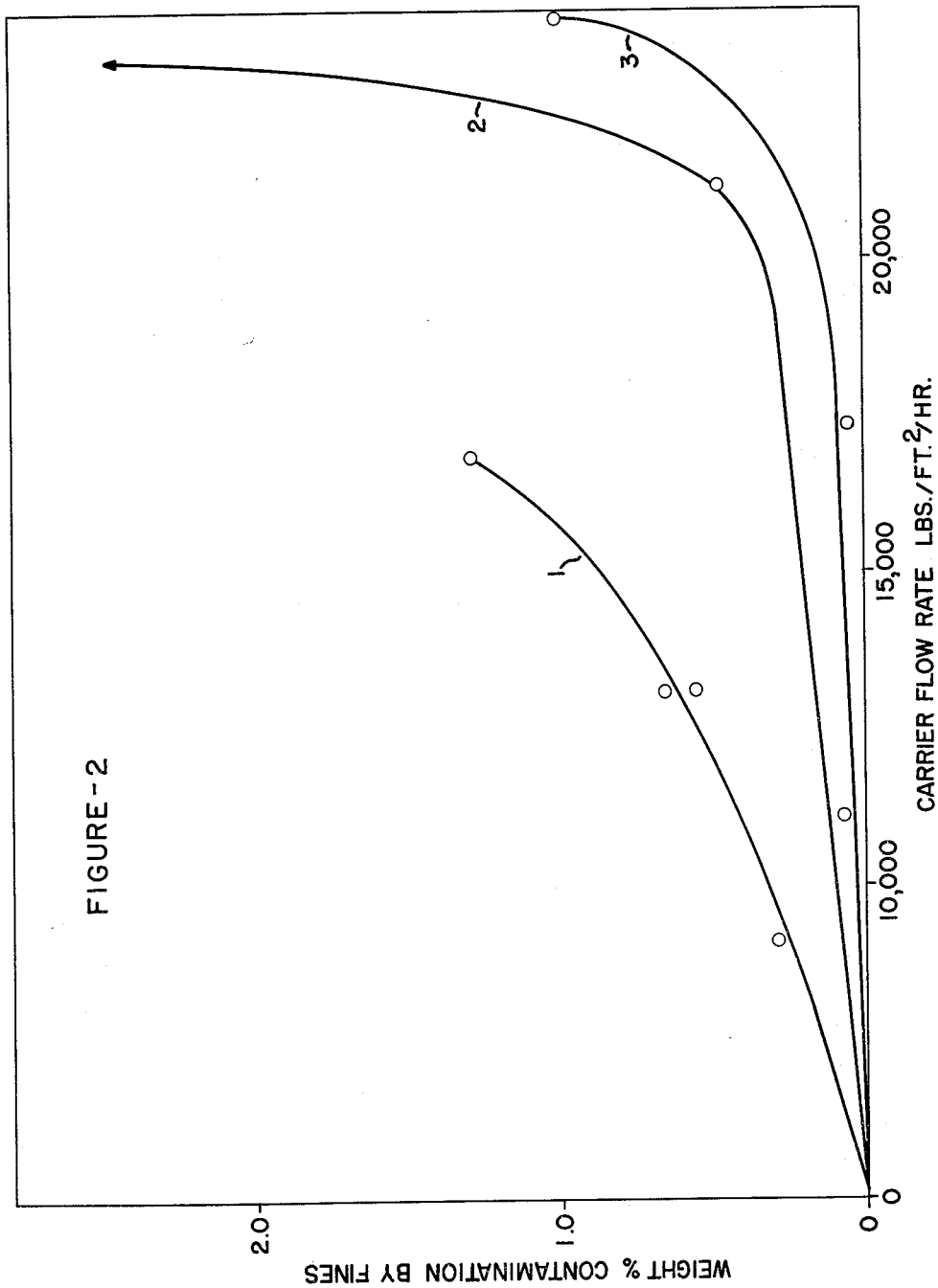

In FIG. 2 is a plot of experimental data on carrier flow rates vs. contamination of the separated carrier by fines and demonstrates how good separation is achieved with the method and means of this invention even at high flow rates of the carrier through a fluidized bed of the fines.

In FIG. 1 is shown a cylindrical vessel 10 adapted to contain a bed of fluidized fines in its intermediate portion 11 and a downward moving bed of separated carrier in its bottom portion 12 starting from the interface I. In said bottom portion the diameter or cross-sectional area may be kept advantageously about the same as in said intermediate portion. For satisfactory separation, the cross-section for a distance below and above the interface I should be constant.

Thus, the cylindrical wall of the vessel 10 may be straight vertically. It may have a slight taper or a flare near the bottom. If the bottom portion containing the moving bed of carrier is of decreased cross-section, the interface must be located therein and also to a certain extent the fluidized bed of fines.

Carrier is introduced at or toward the top of the fluidized bed from inlet line 13 or similar inlets to fall evenly distributed through said bed then form the upper part of the moving bed in zone 12 up to the interface I.

Fines may be introduced toward the bottom of the fluidized bed by inlet 14 or similar inlets like gas inlets 15 spaced around the wall of vessel 10 and essentially above the interface I.

A portion of total gas used, termed primary gas, may be passed into the bottom part of the moving bed through a number of inlets 16. Another portion of the total gas used, called secondary gas, may be passed by inlets 15 into a bottom of the fluidized bed 11 and definitely above the interface I to independently control the gas velocity in fluidized bed and moving bed without causing turbulence in the interfacial region.

A carrier withdrawal hopper 17 section is at the bottom of vessel 10 for removing the carrier from the bottom of the moving bed to a discharge conduit 18.

It is to be noted that slight constriction is shown at the base of the vessel wall although the wall may be perfectly straight down into the hopper 17.

To control the flow rate of carrier from the bottom of the moving bed a cone valve 19 is adjusted vertically to change the opening between the cone and the base of vessel 10. Threaded stem 20 attached to cone 19 is turned in internally threaded block 21 by hand wheel 22 and passes through stuffing box 23. Bar 24 supports the block 21.

Primary gas may also be injected by inlet 25 or similar inlets below the cone 19.

The gas rising to the top of vessel 10 is taken overhead through line 26 to a fines separator cyclone 27 from which separated gas is removed by line 28, separated fines being withdrawn through line 29. Fines may be withdrawn from an upper part of the fines bed in vessel 10 by line 30. If desired, an internal cyclone at the top of vessel 10 may be used.

From past experience with means and procedures for having carrier pass downwardly through a fluidized bed, it was learned that when the carrier is concentrated in the bottom of the fluidized bed, the carrier interferes with fluidization of the fines and is contaminated with fines when withdrawn. While a carrier more coarse and/or dense than the fines aids the concentration of the carrier at the bottom, a carrier that is too coarse gives poor heat transmittal. For best heat transfer it has been found that the difference in coarseness should be low, but to offset this more control is needed to obtain good separation. Surges occurring in the bed cause contamination of the carrier being separated, especially surges in the vicinity of the interface. Generally, the size of the carrier particles should be at least double the size of the coarsest fines, preferably 4 to 10 times the size of the coarsest fines, i.e., the coarsest 10 weight percent of the fines.

By having the carrier form a proper moving bed below the turbulent fluidized bed of fines, extraordinarily effective separation of fines from the carrier can be secured. Furthermore, a moving bed of the carrier must be maintained as a steady non-surging mass which forms a perfect base for the fluidized bed, not only eliminating surge effects but aiding to distribute rising gas across the bottom of the fluidized bed.

By moving bed properly formed is meant a bed in which there is no turbulence. Each particle therein may vibrate somewhat but retains its average position relative to neighboring particles while all the particles move downward as smoothly as possible. Backmixing which is characteristic of turbulent flow is avoided.

Essentially, while the carrier is withdrawn from the bottom of the moving bed, a surprisingly sharp interface or narrow interfacial zone is maintained between the top of the moving bed and the fluidized bed above it.

For carrier and fines of uniform particle size and shape, fluidizing characteristics and separation behavior can be defined in terms of their free falling velocities. However, there is wide distribution of particle size, especially in the fines, although the carrier can desirably be kept at a narrow size distribution or more uniform.

In characterizing the present process, use can be made of the valuable fluidization characteristic called "critical mass velocity" defined by Miller and Logwinuk (Ind. Eng. Chem., 43 1220 (1951)). This characteristic is subject to accurate experimental evaluation as follows:

A mixture of the particles in question is fluidized with gas velocities sufficient to give active dense bed fluidization and the pressure drop through the bed is measured to determine the curve of pressure drop plotted against gas velocity. With good fluidization this relationship is nearly a horizontal line (the pressure drop being the vertical ordinate). However, when the gas velocity is adequately lowered, the pressure drop plotted against gas velocity finally becomes an inclined straight line through the origin. The gas velocity at the intersection of the nearly horizontal line and the second line, both extrapolated, is defined as the critical mass velocity point. The critical mass velocity is expressed as the mass of gas flowing upward per unit of time and per unit area of the total cross-section of the bed of specified solids.

At points along the horizontal line, dense bed fluidization occurs but becomes irregular as critical mass velocity is approached. At points along the steep line through the origin the particles form a stationary bed. The critical mass velocity is not a transition point from stationary to fluid condition, because the transition goes through unstable transition states. However, the critical mass velocity is a reproducible property of a given particle mixture with a given gas at a given pressure and is useful in a manner to be shown.

Effective separation of carrier from fines has a relation to the critical mass velocity. For any given carrier and fines, by maintaining the gas velocity through the interface between the moving bed of carrier and the fluid bed above it substantially at the critical mass velocity of the gas for the carrier measured in the absence of fines, maximum separation of fines is secured. If this gas velocity is above the critical mass velocity of the carrier or too much below contamination by fines becomes excessive. Therefore, it is desirable to have the velocity of the primary gas passing up through the moving bed of carrier just enough below the critical mass velocity to obtain the desired separation of fines.

The critical mass velocity of the gas through the carrier per se must be much greater than that of the gas through the fines per se, and at a ratio thereto as high as compatible with satisfactory heat transfer to and from the carrier. When the ratio is less than 10:1 separation is usually too poor. This ratio is preferably in the range of 15:1 to 45:1.

The separation of fines from carrier is also influenced by the rate of flow of the carrier through fines and particularly through the interface between the moving bed of carrier and fluidized fines above. If this flow rate is too high, contamination becomes excessive. However, with the operation of the present invention, contamination increases slowly with carrier flow rate up to a satisfactorily high flow rate. This is illustrated in the plots of contamination versus carrier flow rate shown in FIG. 2. Curve 2 is obtained from an operation in which microsphere cracking catalyst (fines) is separated from a narrow cut of glass beads (carrier) having an average particle diameter of 0.007 inch, at an air velocity of 0.23 ft./sec. (slightly below the critical mass velocity) for the gas through the carrier at the interface of moving bed with fluidized bed. The contamination at a flow rate below 10,000 lbs./ft.$^2$/hr. is nearly 0.1% and falls to approximately 0.02% at 2,000 lbs./ft.$^2$/hr. But at little over 26,000 lbs. carrier/ft.$^2$/hr., the contamination rises steeply and separation breaks down. Curve 1 is for the same carrier and fines but at an air velocity of 0.17 ft./sec. and illustrates how contamination increases as gas velocity decreases. The operation data plotted in curve 2 shows that optimum separation is obtained when the gas mass velocity through the interface is close to but just below the critical mass velocity with respect to the carrier, e.g., 80 to 99% thereof. Curve 3 shows data on iron bead carrier.

Removal of carrier from the bottom of its moving bed is feasible through a suitable constriction without causing disturbances in the upper part of this bed. For example, with the cone valve of a diameter similar to the diameter of the vessel 10 at its base and the cone adjusted to leave a uniform circular opening for flow of the carrier, excellent control is obtained. A slide valve or rotatable valve devised to provide a similar kind of opening can be used.

While the moving bed must be free of turbulence at the interface with the fluidized bed, it is not necessary to eliminate turbulence at the bottom of the moving bed. The separation of the fines must be made to occur at the narrow zone above the interface. For example, in the cone valve controlled unit, one can admit all the primary gas for the moving bed through the annular opening between the cone and wall of vessel 10 where carrier is withdrawn. In this instance, the gas velocity through this opening is high enough to be above the critical mass velocity for the carrier and cause some turbulence. On the other hand, as the gas rises it becomes distributed across the cross-section of the moving bed, the gas velocity then falls sufficiently to make the moving bed non-turbulent at its upper part to its top level which is at the interface I.

A certain amount of carrier should be allowed to accumulate in establishing the moving bed. For example, using the cone valve and carrier particles described, a minimum carrier accumulation of 15 lb./sq. ft. in the moving bed is essential. While more accumulation means a deeper moving bed and more pressure drop through it, a larger factor of safety in operating controls is obtained. With coarser particles the accumulation necessary increases. The minimum accumulation needed rises somewhat proportionately to the free-falling velocity of the carrier.

Other things being equal, the gas passing through the moving bed should be preferably well distributed. To aid in distributing this gas, the conical valve or any other device for controlling the discharge of the carrier from the moving bed may have perforated construction. Gas distribution is also improved by a deep moving bed.

Summarizing in simple terms requirements for operating a reactor denoted by vessel 10 in FIG. 1 for good separation of carrier from fines:

(a) Carrier introduced into an upper part of a fluidized bed of fines is accumulated as a moving bed below an interface with the fluidized bed through which the carrier is made to fall, the flow rate of the carrier through the interface being kept below a value at which fines are carried down into the moving bed excessively.

(b) Upward gas velocity through the moving bed at the interface with the fluidized fines bed is kept as near as practicable to the critical mass velocity of the gas through the coarse material but below it to prevent turbulence at the top of the moving bed, i.e. at the interfacial region.

(c) The critical mass velocity (lbs. gas/hr./sq. ft.) ratio for carrier per se/fines per se is as high as compatible with good heat transfer.

(d) The depth of the moving bed of carrier should be sufficient to secure good gas distribution through its top surface at the interface.

Maintaining a gas velocity lower in the moving bed than in the fluidized bed and keeping the reactor diameter constant makes desirable the splitting to the total gas feed to obtain independent control of the primary and secondary gas. Keeping the reactor diameter constant for a distance above and below the interface is decidedly important for required smoothness of descent of the carrier particles in the moving bed. Likewise, this is aided by preventing bridging of the carrier and continuous smooth discharging of the carrier particles, as through the annular opening between a conical valve and the wall at the back of the reactor vessel.

When the gas velocity through the moving bed can be increased, the low part of the vessel may have a more constricted cross-section occupied by the moving carrier bed and some of the fluidized fines bed above the interface. For operational flexibility, the narrowed cross-section may be constricted so that the lowest total feed gas suitable for maintaining the fluidized bed of fines will be enough to maintain the carrier in the moving bed without turbulence at the interface. For example, using iron beads of 0.013 inch diameter with a free falling velocity 26 times that of the microsphere catalyst fines, and of 3 times the density of the glass beads, the critical gas velocity for the iron beads being in the region of 0.8 ft./sec., then the suitable gas velocity at the interface is 70 to 90% of this value, or at the mean value of 0.6 ft./sec. Flow rates and separation for the metal beads are shown by curve 3.

The carrier may be made of various refractory materials such as Mullite, silica, carbon, magnesia, sintered alumina, stainless steel, in usually about 200 to 1000 micron or larger diameter granules. They may be used for supplying heat for distillation of shale fines, for cracking or reforming hydrocarbon vapor with a fluidized catalyst, or for removing heat in exothermic reactions, such as oxidations and hydrogenations of organic compounds. An example of utility is as follows:

*Example*

In the reduction of ferrous oxide fines (20 to 100 microns) to elementary iron fines at 900° C. with reducing gas containing principally methane which fluidizes the fines, the high heat of reaction is supplied principally by coarse MgO particles (400 to 500 microns) as carrier passed down through the fluidized bed of fines and accumulated at the bottom of a vertical reactor as a moving bed, this accumulation being at least 15 lbs./sq. ft. The carrier preheated to 1100° C. is introduced into an upper part of FeO fines mixed with reduced Fe fines in the reactor and fall through the fluidized bed at a flow rate of 15,000 lbs./sq. ft. just above the moving bed, the carrier having a free falling velocity at least 10 times that of the coarsest fines. The falling carrier is accumulated in the moving bed, the top of which is an interface with the fluidized fines. The reducing gas is supplied at the bottom of the moving bed to make the gas velocity at the interface remain in the range of 0.2 to 0.3 ft./sec. and adjusted so that no turbulence occurs in the upper part of the moving bed. Carrier is removed continuously from the bottom of the moving bed to maintain a constant interface level. At three inches above the interface more of the hot reducing gas as secondary gas is introduced, if needed, into the fluidized bed of fines at a rate to make the gas velocity through the fluidized fines 1.5 ft./sec. With continuous addition of the feeds and removal of fines from the top of the fluidized bed, the reduced Fe fines content of separated fines is kept in the range of 80 to 90 weight percent. The withdrawn carrier containing less than 1.5 weight percent fines is reheated with hot combustion gas, and recycled at 1100° C.

Selections of conditions, kinds of carriers, fines and gases may be varied, but the following general ranges include the values found best adapted with the present process for obtaining good heat transfer, fluidization of fines, and separation of carrier from fines, especially to leave the separated carrier contain less than 1 weight percent fines.

| | | |
|---|---|---|
| Fines, size | microns | 10 to 200 |
| Carrier, size | do | 200 to 1000 |
| Primary gas, velocity | ft./sec. | 0.2 to 0.8 |
| Fluidization gas, velocity | ft./sec. | 1 to 5 |
| Carrier flow rate | lb./ft.$^2$/hr. | 5000 to 30000 |
| Moving bed, accumulation | lb./ft.$^2$ minimum | 15 |

The carrier size would be about 2 to 8 times the average size of the coarsest 10 weight percent of the fines, e.g., if 10 weight percent of the coarsest fines averages 100 microns, the carrier size should be above 200 microns. Density is a factor in the flow of carrier down through the fluidized fines and the carrier may be selected to be more dense as well as larger than the fines to give the carrier a high falling velocity through the fines.

The densities of the carrier materials are usually in the range of about 1 to 6 gm./cm.$^3$, e.g., such materials as coke, magnesia, silica, alumina, Mullite, zirconia, chromite, iron oxides, iron alloys. The primary gas velocity through the interface is maintained at between 70 and 100% of the critical mass velocity (C.M.V.) with respect to the carrier to obtain a smooth downward movement of the moving bed without turbulence at its top level. The C.M.V. for gas through the fines is substantially lower.

The invention described is claimed as follows:

1. A process of separating coarse carrier particles which fall dispersed through a bed of fluidized fine particles which comprises introducing the carrier at the top of the bed of fluidized fines so that the carrier falls dispersed downwardly through the fines in a rising gas stream which fluidizes the fines, said carrier particles having a particle size of about 2–8 times that of the coarsest 10 weight percent of fines in said bed, accumulating the carrier in a downwardly moving bed immediately below the fluidized fines bed, said moving bed consisting essentially of a moving bed of carrier particles wherein said particles vibrate but retain their average position relative to neighboring carrier particles, wherein, the moving bed of carrier particles have a steady non-surging top level interface with the bottom part of the fluidized fines bed and back mixing and turbulent flow in the moving bed is avoided, passing gas up through the downwardly moving bed of carrier uniformly distributed as the gas passes through said interface, maintaining the gas velocity through the interface substantially at but below the critical mass velocity of the gas for the carrier measured in the absence of fines and at a velocity below which turbulence is created in the upper part of the moving bed, adding fines to the bed of fluidized fines, withdrawing fines and gas from the upper part of said fluidized fines bed, and separately withdrawing carrier from a bottom part of the moving bed at a rate to maintain said top level interface about constant.

2. The method of claim 1, in which the moving bed and the fluidized bed have substantially the same diameter for a distance below and above the interface.

3. The method of claim 1, in which gas is passed through a sufficient part of said moving bed to develop a uniform distribution of gas on passing through said interface and additional gas is introduced into a bottom part of the fluidized fines bed above said interface to make gas passing up through the fluidized fines bed have a substantially higher velocity than the gas passing up through the moving bed.

4. In a process of using coarse particles as a heat carrier falling dispersed through a bed of fluidized fines of up to about 200 micron size and separating the carrier from the fines, the improvement which comprises flowing the carrier having a particle size of about 2 to 8 times that of coarsest 10 weight percent of fines in said bed down through the bed of fluidized fines to accumulate the carrier with less than 1 weight percent of fines in a moving bed, said moving bed consisting essentially of a moving bed of coarse carrier particles wherein said particles vibrate somewhat but retain their average position relative to neighboring carrier particles having an accumulation of at least 15 lbs./sq. ft., continuously discharging carrier from the bottom part of said moving bed to maintain substantially constant non-surging interface of the moving bed at its top level with the bed of fluidized fines and passing gas up through said moving bed at a rate that makes the velocity of said gas through the interface below the critical mass velocity of the gas through the carrier free of fines and uniformly distributed to prevent turbulence in the upper part of said moving bed.

5. In the process of claim 4, said critical mass velocity for the gas through the carrier free of fines being in the range of about 0.2 to 0.8 ft./sec., and the velocity of the gas passing through said interface being between 70 and 100% of said critical mass velocity.

6. In the process of claim 4, the diameter of the moving bed for a distance below the interface being substantially the same as that of the bed of fluidized fines for a distance above the interface, and added gas being introduced above said interface for a gas velocity of about 1 to 5 ft./sec. through the fluidized fines bed.

7. In the process of claim 4, the carrier being discharged from a bottom part of the moving bed outwardly through an annular opening having an outer diameter substantially the same as the bottom part of the moving bed.

8. In the process of claim 4, the carrier being discharged at a uniform rate through an opening at the bottom of the moving bed and at least a portion of the gas passing up through said bed being introduced below said opening.

9. In the process of claim 4, the carrier particles being of more uniform size than the fines and with diameters in the range of 200 to 1000 microns.

10. In the process of claim 4, gas flowing up through the bed of fluidized fines being at a velocity of 1 to 5 ft./sec. while gas up through the moving bed of carrier is at a velocity of 0.2 to 0.8 ft./sec., the carrier having a density of 1 to 6 grams per cubic centimeter and flowing through the interface at a rate of 5000 to 30,000 lbs./ft.$^2$/hr.

11. In a process of using coarse particles as a heat carrier falling dispersed through a bed of fluidized fine particles, the improvement which comprises introducing the carrier at the top of the bed of fluidized fines so that the carrier falls dispersed downwardly through the fines in a rising gas stream which fluidizes the fines, said carrier particles having a particle size of about 2–8 times that of the coarsest 10 weight percent of fines in said bed, accumulating the carrier immediately below the fluidized fines as a downwardly moving bed having a steady non-surging top level interface with the bottom part of the fluidized fines bed, passing gas up through the downwardly moving bed of carrier uniformly distributed as the gas passes through said interface, maintaining the gas velocity through the interface substantially at but below the critical mass velocity of the gas for the carrier and at a velocity below which turbulence is created in the upper part of the moving bed, adding fines to the bed of fluidized fines and introducing a major proportion of gas which flows up through the fluidized bed of fines near the bottom of said bed but essentially above said interface to prevent turbulence at the interface while effecting an increased upward flow of gas and fines above said interface, withdrawing fines and gas from the upper part of said fluidized fines bed, and separately withdrawing carrier from a bottom part of the moving bed at a rate to maintain said top level interface constant.

12. A method of separating coarse particles that fall dispersed downwardly through a bed of fluidized fine particles, said coarse particles having a particle size about 2 to 8 times that of the coarsest 10 weight percent of fines in said bed, which comprises accumulating said coarse particles immediately below the fluidized fines bed as a downwardly moving bed having a steady non-surging top level interface with said fluidized fine particles, said moving bed consisting essentially of a moving bed of carrier particles wherein said carrier particles vibrate but retain their average position relative to neighboring carrier particles, passing gas uniformly distributed up through that part of said moving bed immediately below the interface substantially at but below the critical mass velocity of the gas measured in the absence of fines and at a velocity below that at which turbulence is created at said interface and discharging the coarse particles from a bottom part of said moving bed to maintain said top level interface.

References Cited in the file of this patent

UNITED STATES PATENTS

| | | |
|---|---|---|
| 196,259 | Solvay | Oct. 16, 1877 |
| 2,400,194 | Day et al. | May 14, 1946 |
| 2,455,915 | Borcherding | Dec. 14, 1948 |
| 2,465,416 | White | Mar. 29, 1949 |
| 2,554,264 | Odell | May 22, 1951 |
| 2,621,118 | Cyr | Dec. 9, 1952 |
| 2,631,921 | Odell | Mar. 17, 1953 |
| 2,631,967 | Dutcher | Mar. 17, 1953 |
| 2,700,592 | Heath | Jan. 25, 1955 |
| 2,761,769 | Elder | Sept. 4, 1956 |